May 12, 1931.  W. D. DEWEND  1,804,750
DISK HARROW
Filed Feb. 16, 1929
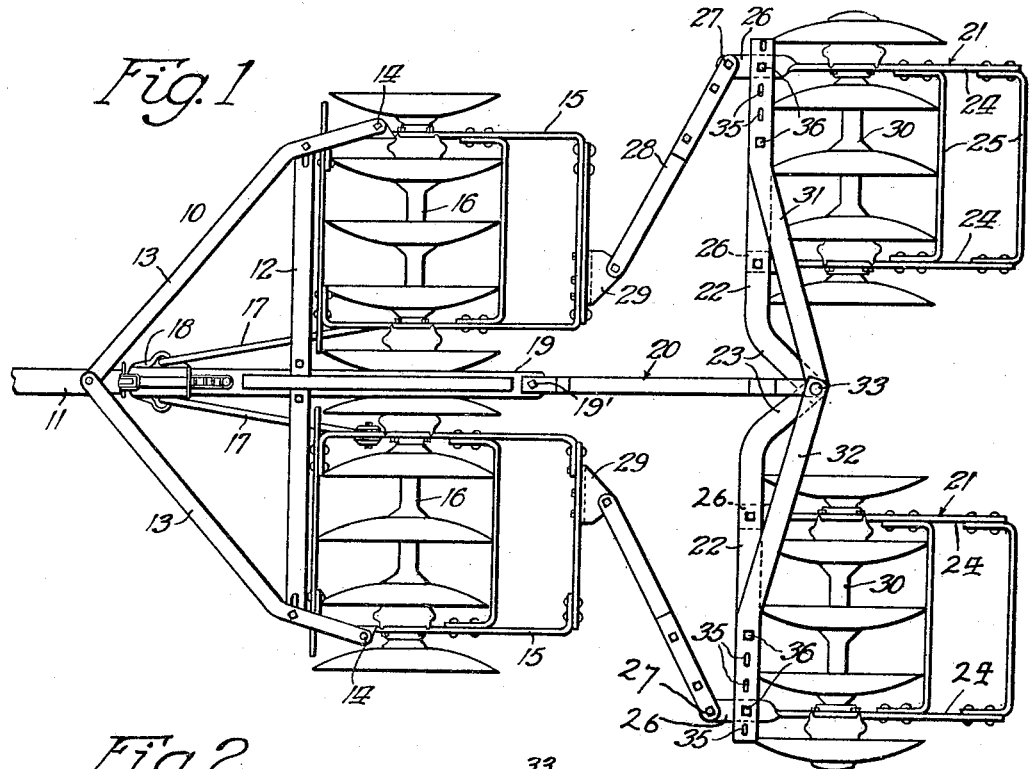
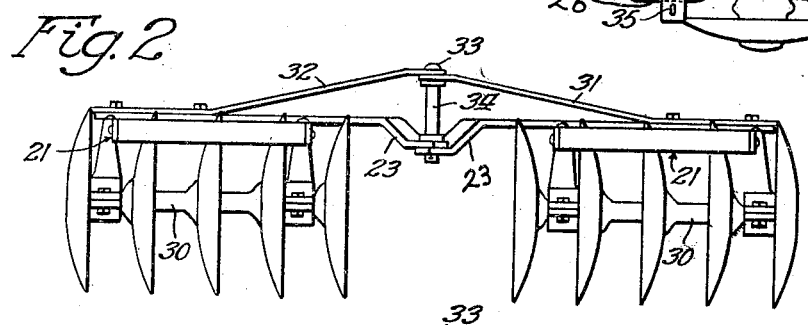
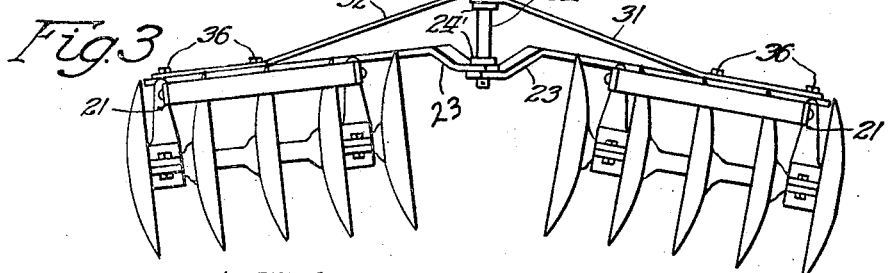
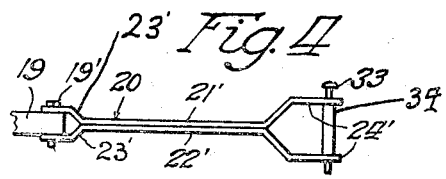
Inventor
William D. Dewend
John P. Smith
Atty.

Patented May 12, 1931

1,804,750

UNITED STATES PATENT OFFICE

WILLIAM D. DEWEND, OF SOUTH BEND, INDIANA, ASSIGNOR, BY MESNE ASSIGNMENTS, TO OLIVER FARM EQUIPMENT COMPANY, A CORPORATION OF DELAWARE

DISK HARROW

Application filed February 16, 1929. Serial No. 340,511.

This invention relates to disk harrows and more particularly, to a device for adjusting the rear gangs of a tandem disk harrow so that the outer ends thereof may be so elevated or depressed with respect to the inner ends thereof for varying the penetration of the disks into the ground.

A further object of the invention is to provide a simple and improved form of an adjustment and pivotal connection for the rear gang of a tandem disk harrow in which each gang of the rear rank may be adjusted with respect to the other for more effectively and aggressively penetrating the ground in hard soil, or in which the gangs may be adjusted so as not to excessively penetrate the ground in soft soil.

These and other objects are accomplished by providing a construction and arrangement of the various parts in the manner hereinafter described and particularly pointed out in the appended claims.

Referring to the drawings, Fig. 1 is a top plan view of my improved form of tandem disk harrow.

Fig. 2 is a rear elevational view of the rear rank of the tandem disk harrow shown in Fig. 1 with the gangs or disks located in transverse axial alignment.

Fig. 3 is a rear elevational view of the rear rank of disk gangs shown in Fig. 1 with each gang thereof, angled with respect to the other so that the outer ends thereof may more aggressively engage the ground, and Fig. 4 is a side elevational view of the supplemental draft member which forms the pivotal connection for the rear disk gangs.

In illustrating one form of my invention, I have shown the same in connection with a tandem disk harrow of the type disclosed and claimed in the co-pending application of Herman E. Altgelt, Serial No. 288,703 and comprises a front disk harrow frame generally indicated by the reference character 10, which includes a tongue or draft member 11 to which is secured a transverse frame member 12. Diagonally extending from the outer ends of said transverse frame member 12 are two converging frame members 13, which have their forward ends secured to the draft member 11. The rearward ends of these angularly disposed frame members 13 extend rearwardly forming pivotal connections as shown at 14 for each of the gang frames 15. Revolvably mounted in each of the gang frames in a manner well understood in the art, are the usual disk gangs 16. The inner ends of these gang frames 14 are capable of rearward movement from the position shown in Fig. 1 by having their inner ends connected to draft links 17 which in turn, have their forward ends connected to a sliding head 18. Pivotally secured, as shown at 19', to the rearwardly extending portion 19 of the draft member or tongue 11 is a supplemental draft member 20 to which are pivoted the rear gang frames 21. This supplemental draft member 20 comprises an upper and lower bar 21' and 22' which are secured together and have their forward ends offset as shown at 23' so as to form substantially a bifurcated portion in order to receive the rearward extension 19 therebetween. The rearward ends of these supplemental draft members 21' and 22' are similarly offset as shown at 24' so as to form a bifurcated portion in order to support the pivotal bolt hereinafter described for the rear gangs. The rear gang frames 21 comprise transversely extending front frame members 22 which have their inner ends bent rearwardly and downwardly as shown at 23 at a point adjacent the pivotal connections of the rear frames with the supplemental draft member 20. Secured to the horizontal transverse frame members 22 and forming a substantially rectangular frame structure, are two rearwardly extending longitudinally disposed frame members 24 which are braced or secured together by two transverse rear members 25. The forward ends of each of the longitudinally extending frame members 24 are twisted as shown at 26 and secured to the transverse forward frame members 22 by means of bolts. Each of the outer longitudinally extending frame members is pivotally connected as shown at 27, by means of an adjustable link 28, to the front gang frames 15 through the medium of brackets 29 secured to the rear side of the front frames 15. Journaled in each of the rear gang frames 21, in a manner well understood in the art, are disk gangs 30.

An essential feature of the present invention consists in the novel employment of means for adjusting the rear gangs relative to each other to vary the aggressiveness of the rear disks in engaging the ground, so as to take care of variations in the different types of soil, and also, to form a thrust construction for maintaining the disks in their relative angular position to which they are adjusted. This construction comprises two thrust adjustable brace members 31 and 32 which are mounted on the upper or offset portion 24' of the supplemental draft member 20 and pivotally connected thereto by means of a bolt or pin 33. The lower inner ends of the offset portions 23 of the transverse frame members 22 are also pivotally connected in alignment with the lower offset portion 24' of the supplemental draft member 20 and receive the pin 33 therein for forming the pivotal connection for the rear disk gangs. In order to hold these members in proper spaced or thrust relation, I have provided a spacer tube 34 through which the pin 33 extends, as clearly shown in Figs. 2 and 3. The outer ends of the adjustable thrust members 31 and 32 are provided with a plurality of slotted holes as shown at 35 which are adapted to be adjusted in complementary alignment with holes in each of the transverse gang frame members 22 for adjusting each of these thrust members and securing them to these transverse frame members by means of bolts 36.

In the operation of my improved means for adjusting the relative angular position of the rear gangs with respect to each other, the same may be adjusted from the position shown in Fig. 2 to that shown in Fig. 3 or any intermediate position, by merely loosening the bolts 36 and prying or lifting the pivotal point or pin, together with its connected parts, upwardly to the position shown in Fig. 3, then securing or tightening bolts 36, causing the rear gangs to assume the desired relative angle with respect to a horizontal plane so that the depth penetration of the outer ends of the rear disk gangs be adjusted for different soil conditions, in the manner clearly illustrated in Fig. 3 of the drawings.

While in the above specification, I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. A harrow comprising a draft member, gangs pivotally connected to said draft members on a single pivot, and means for adjusting the angle of said gangs vertically with respect to said pivot.

2. A harrow comprising a draft member, disk gangs pivoted for horizontal movement, a vertically disposed pin on which said gangs are pivoted and means for adjusting said gangs vertically with respect to said pin for angling said gangs with respect to each other.

3. A harrow comprising a draft member, disk gangs pivoted for horizontal movement on which said gangs are pivoted, a vertically disposed pin, and thrust members adjustably connected to said gangs and pivoted to said pin whereby said members may be adjusted with respect to said gangs for angularly adjusting said gangs in substantially a vertical plane with respect to each other.

4. A harrow comprising a draft member, gang frames pivoted to said draft member, said gang frames including horizontally disposed frame members having their inner ends offset and pivotally connected to said draft member, adjustable thrust members pivoted concentrically with the inner ends of said harrow frame members and adjustably secured to said frame members and means for holding said pivoted gang frame members in spaced relation with respect to said thrust members.

5. A harrow comprising a draft member, gang frames pivoted to said draft members, said gang frames including horizontally disposed frame members having their inner ends offset and pivotally connected to said draft member, adjustable thrust members pivoted concentrically with respect to said frame members, a spacer member for holding said pivoted gang frame members in spaced relation with said thrust members and means for adjustably securing the outer end of said thrust members to the outer ends of said pivoted gang frame members, whereby said gang frames may be vertically adjusted with respect to said pivot.

6. A disk harrow comprising a draft member, said draft member having a bifurcated portion on the rear end thereof, disk gangs pivoted to said draft member, said disk gangs including gang frames, forward gang frame members pivotally connected to the lower bifurcated portion of said draft member, thrust members pivoted to the upper bifurcated portion of said draft member, the outer ends of said thrust members being adjustably secured to said gang frame members for adjusting said gangs vertically with respect to each other, and a bolt extending through the bifurcated portion of said draft member, said gang frame members and said thrust members for rigidly supporting said gangs in various positions of adjustment.

7. A harrow comprising a draft member, gangs pivotally connected to said draft member, a single pivot forming the pivotal connection between said gangs, and means inclined upwardly toward the pivot thereof and adjustably connected with said gangs for adjusting the angle of said gangs vertically with respect to said pivot.

8. A harrow comprising a draft member, gangs pivotally connected to said draft member, a single pivot forming the pivotal connection between said gangs, and members secured to said gangs and having their inner ends pivoted concentrically with the pivot of said gangs, the pivot of said members being held in spaced-apart relation with respect to the pivot of said gangs and means whereby said members may be adjusted with respect to said gangs for adjusting the angle of said gangs vertically with respect to each other.

In testimony whereof I have signed my name to this specification, on this 13 day of February, A. D. 1929.

WILLIAM D. DEWEND.